Figure 7:
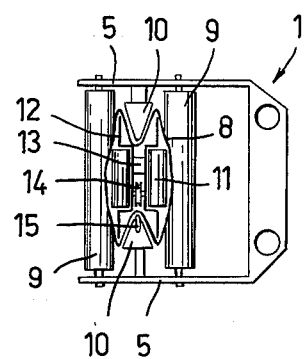

United States Patent [19]

Turunen

[11] 3,916,769
[45] Nov. 4, 1975

[54] APPARATUS FOR FORMING A SACK FROM A CONTINUOUS TUBE BLANK

[75] Inventor: Lasse Juhani Turunen, Mantta, Finland

[73] Assignee: G. A. Serlachius Oy, Mantta, Finland

[22] Filed: May 3, 1974

[21] Appl. No.: 466,888

[30] Foreign Application Priority Data
May 7, 1973  Germany.......................... 23228402

[52] U.S. Cl. .......................... 93/24; 53/187; 93/27; 93/334; 93/DIG. 1; 156/515
[51] Int. Cl.[2] ..................... B32B 31/18; B31B 1/78; B32B 31/20
[58] Field of Search ............... 93/21, 23, 22, 25, 26, 93/27, 18, 33 H, DIG. 1, 35 R; 156/251, 515; 53/183, 187, 192

[56] References Cited
UNITED STATES PATENTS
2,753,769  7/1956  Burroughs............................... 93/22
3,735,673  5/1973  Sheehan et al...................... 93/35 R Primary Examiner—Robert L. Spruill
Assistant Examiner—Leon Gilden
Attorney, Agent, or Firm—Waters, Schwartz & Nissen

[57] ABSTRACT

An apparatus for forming a sack from a continuous tube blank. The apparatus comprises a first carriage provided with means for gripping the edge of the mouth opening of the tube blank and for pulling said tube blank upon a filling rack and a second carriage provided with means for spreading out said mouth opening and means for transverse seaming and cutting of said tube blank when it has been pulled upon said filling rack. Said first and second carriages are displaceable mutually and with respect to said filling rack along a common path of movement.

6 Claims, 9 Drawing Figures

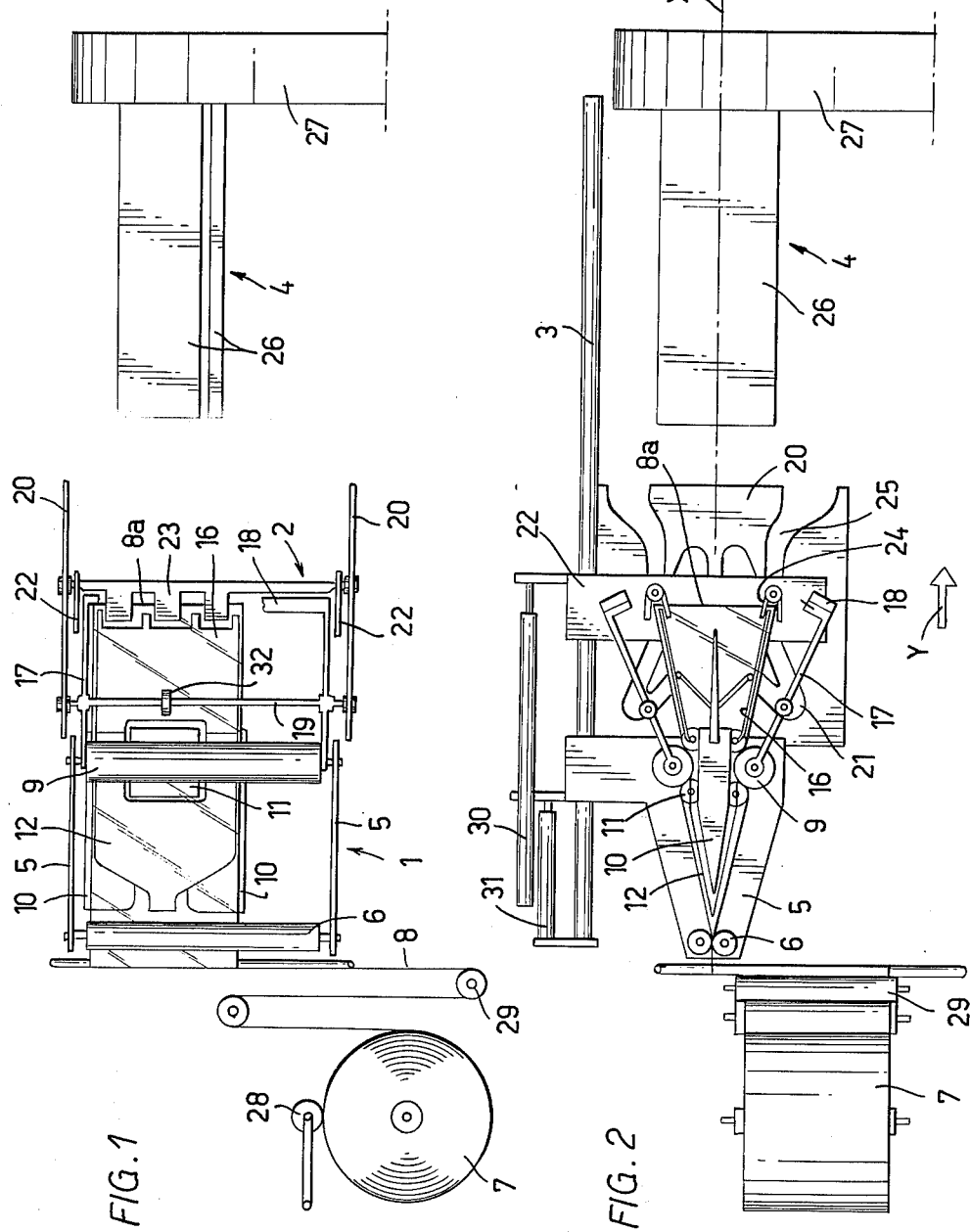

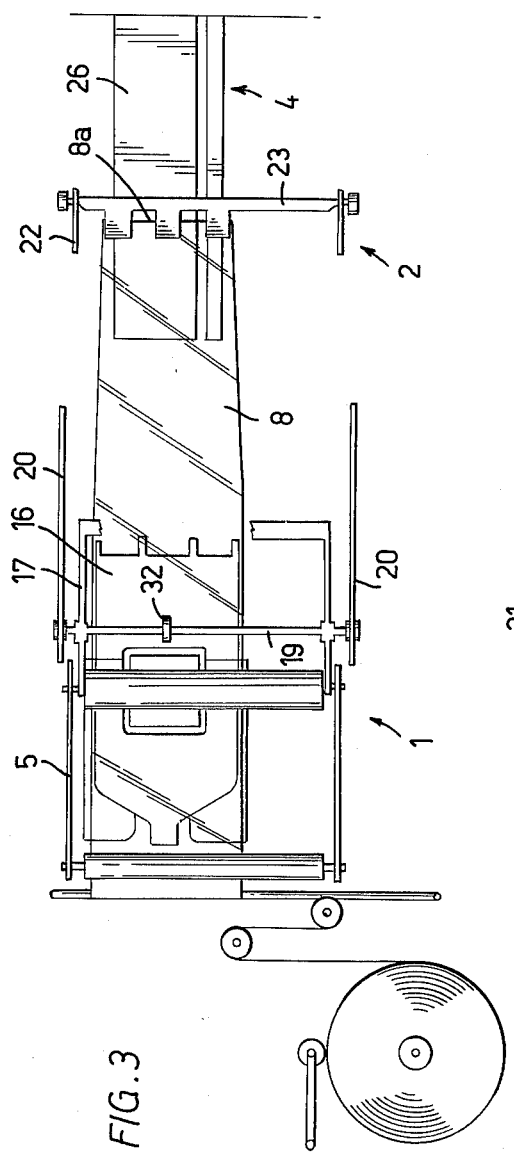
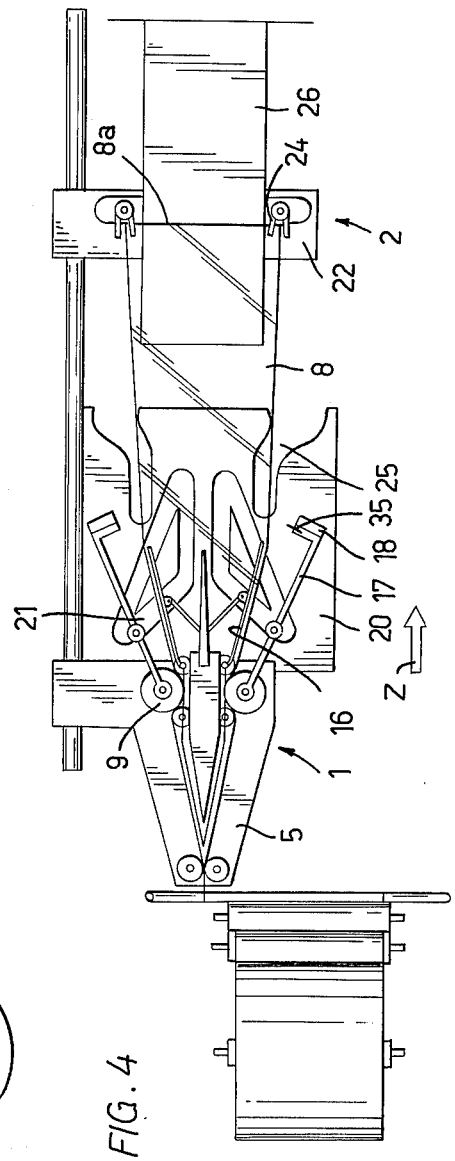

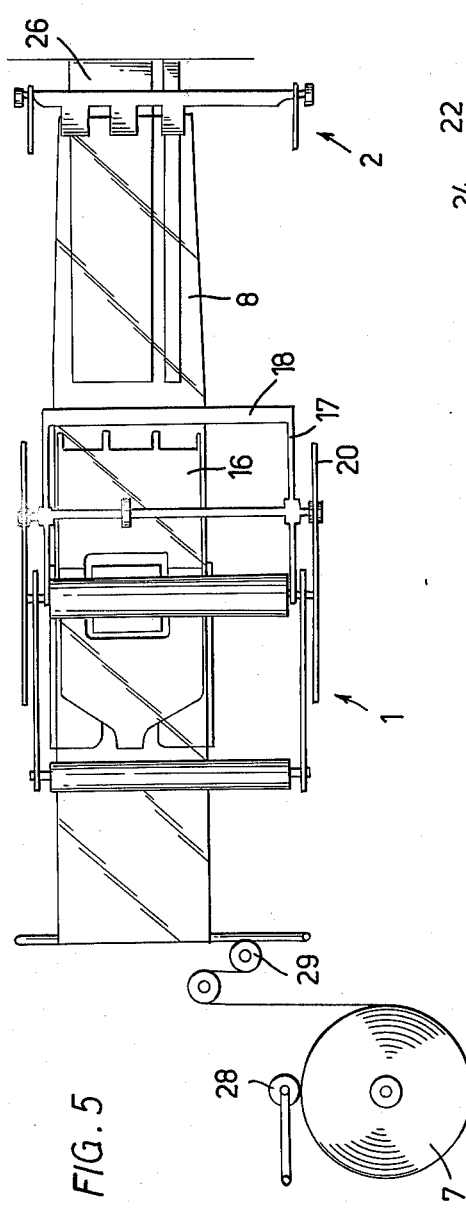
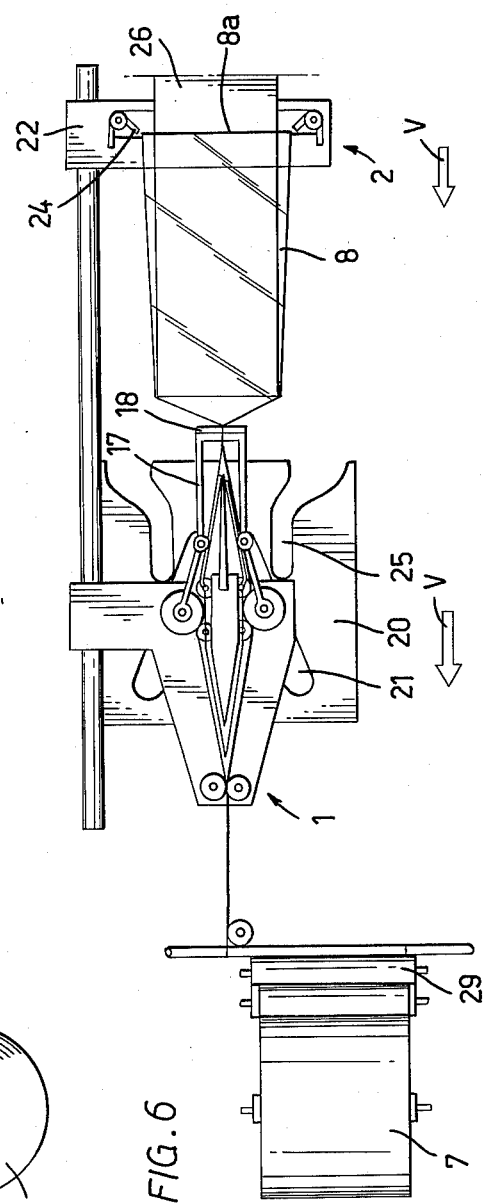
FIG. 5
FIG. 6

APPARATUS FOR FORMING A SACK FROM A CONTINUOUS TUBE BLANK

This invention relates to an apparatus for forming a sack from a continuous tube blank of flexible material such as plastics and for stretching out the sack to an opened position upon a filling rack comprising at least two jaws.

Rather large-sized bags or sacks of plastic material or the like, which are used particularly in packing of amounts of piece-goods for storage and transport to wholesale and retail dealers, have so far been produced by preseaming and cutting tube blank pieces of a desired length from a continuous tube blank, and one end of the tube blank pieces have been seamed to form a closed bottom. The ready sacks thus obtained have then been brought close to a packing machine and have been adjusted by hand upon the jaws of a filling rack. However, to take ready sacks from a stack, to spread them out and to arrange them upon the jaws call forth considerable manual labour and hamper an increase in the operational speed of the whole packing machine.

The object of this invention is to provide an apparatus which removes these disadvantages, and this is achieved by the apparatus according to the invention which is characterized by comprising two aligned carriages moving along the same path of movement, one carriage being provided with means for gripping the edge of the mouth opening of a tube blank and for pulling the tube blank upon the jaws of a filling rack, the other carriage being provided with means for spreading out the mouth opening of said tube blank and means for transverse seaming and cutting of said tube blank when the first-mentioned carriage has pulled a desired tube blank length upon said rack.

According to the invention there is provided an apparatus by means of which producing of sacks from a continuous tube blank, their out-spreading and adjusting upon the jaws of a filling rack can be performed fully mechanically and automatically in connection with a packing machine. However, this kind of apparatus can also be applied in such cases in which goods are, for one reason or another, packed into sacks by hand.

Figure 8:
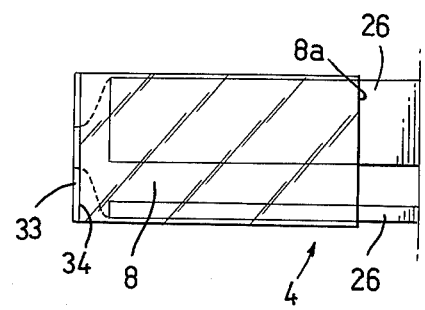
Figure 9:
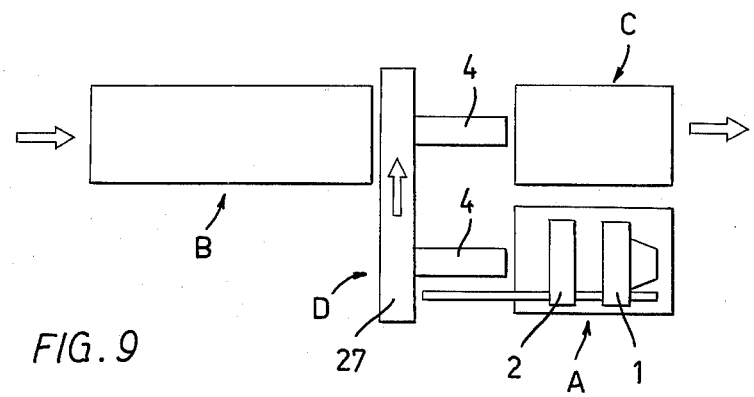

The invention is more closely described in the following with reference to the accompanying drawings which schematically illustrate a preferred embodiment of the invention, whereby FIGS. 1 and 2 show a side resp. top view of the apparatus in the starting position, during the gripping phase of a pulling carriage, FIGS. 3 and 4 show a side resp. top view of the apparatus during the pulling phase of said carriage, FIGS. 5 and 6 show a side resp. top view of the apparatus during the seaming and cutting phase of a spreading carriage, FIG. 7 shows a cross-section of the spreading carriage, FIG. 8 shows a side view of a ready sack, and FIG. 9 schematically shows a top view of the location of the apparatus in connection with a packing machine.

For the sake of clarity, the apparatus has been described in the drawings in so simplified a form as possible, whereby the base, body, different carriers and supports, and operating mechanism of the apparatus and that sort of machine parts self-evident for a person skilled in the field have not been presented.

The apparatus mainly comprises the spreading carriage 1 and the pulling carriage 2 which are supported by common horizontal guide rods 3, and the filling rack 4, whereby both the carriages and the rack are aligned along the same middle line X.

The spreading carriage 1 comprises vertical guide rollers 6 supported by body plates 5, between which rollers is brought the tube blank 8 which comes from a roll 7 and is folded at its opposite edges. Spaced apart from the guide rollers there are positioned vertical outer supporting rollers 9 supported by the body plates, which supporting rollers together with upper- and lower wedges 10 co-operate with vertical counter-rollers 11 and core plates 12 inside the tube blank, which are provided to maintain a desired, folded cross-section of the tube blank, as shown in FIG. 7. The counter-rollers and the core plates are mounted on a body 13 provided with a wheel 14, by means of which a supporting wheel 15 mounted on the lower wedge supports the body 13.

On the body 13 there are further hinged vertical, plate-shaped spreading arms 16 which are pressed by springs outwards in opposite directions. On the spreading carriage, on the outer sides of the spreading arms 16, there are further pivotably mounted horizontal supporting arms 17 which support vertical seaming- and cutting ribs 18 (for the sake of clarity, the ribs 18 are shown only partly in FIG. 1 and 3, and wholly in FIG. 5). To the supporting arms 17 are connected vertical bars 9, the upper- and lower ends of which slide in guide slots 21 in the fixed horizontal plates 20.

The pulling carriage 2 comprises upper- and lower body frames 22 which support vertical supporting plates 23 on the inner sides of which there are mounted pivotable gripping claws 24. The upper- and lower ends of said supporting plates slide in guide slots 25 in said fixed plates 20.

The filling rack 4 comprises two mutually parallel, horizontal jaws 26 displaceable toward and from each other in the vertical direction. The jaws may be connected to a rotating table 27 having horizontal axis of rotation, or said jaws are displaceable by some other means to the sack-filling position.

The apparatus further comprises a rack for the plastic tube blank roll 7 and a brake 28 for controlling the rotation of said roll and a storage roller 29 is provided to ensure smooth feed of said tube blank.

The apparatus operates in the following manner:

In the starting position shown in FIGS. 1 and 2 the gripping claws 24 of the pulling carriage are made to turn to a closed position by means of suitable operating devices, whereby said claws grip the edge 8a of the tube blank 8. Thereafter the pulling carriage 2 is moved in the direction of the arrow Y by a cylinder 30 towards the filling rack 4, whereby the gripping claws pull said tube blank with them from the spreading carriage 1 between the rollers 9 and 11. When the pulling carriage is moving with respect to the plates 20, the guide slots 25 force the supporting plates 23 of the gripping claws to move away from each other, so that the mouth opening of the tube blank is spread wider than the profile of the claws 26 moved together.

When the cylinder 30 has pushed the pulling carriage with its tube blank to the position shown in FIGS. 3 and 4 upon the filling rack 4, the spreading carriage 1 starts to move, pushed by the cylinder 31, in the direction of the arrow Z towards the filling rack 4, whereby the spreading carriage 1 pushes the pulling carriage 2 ahead of it. Hereby, the guide slots 21 of the plates 20 force the supporting arms 17 to pivote towards the tube blank and to press simultaneously the spreading arms 16 toward each other by means of the rolls 32.

When the spreading carriage 1 has reached the position shown in FIGS. 5 and 6, the pulling carriage 2 has wholly pulled the tube blank upon the claws 26 and the seaming- and cutting ribs 18 are pressed against the tube blank, so that the tube blank is sealed and cut to form the bottom of a sack. The seaming line is marked with the reference numeral 34 and the cutting line, with the reference numeral 33 in FIG. 8. A cutter 35 is shown in FIG. 4 for instance.

Thereafter the operating devices of the gripping claws receive an impulse to open the claws whereby the edge of the mouth opening of the tube blank slides away from the claws, and the operating cylinders of the carriages 1 and 2 receive an impulse to pull the carriages in the direction of the arrow V back to their starting positions shown in FIGS. 1 and 2. The brake 28 of the roll is simultaneously released to enable said roll to rotate and the storage roller 29 to move downward by its own weight and to pull from the roll such tube blank length as required for the next sack-pulling phase. When the storage roller has moved to its lower position the brake 28 is closed again.

When the carriages have returned to their starting positions, the operating mechanism of the filling rack receives an impulse to move the jaws 26 apart from each other so that the sack tightens round the jaws, and to pivot the rotating table 27 through 180° until it is close to the filling machine. Hereby, one pair of jaws pivotes to the sack-pulling machine and a new pulling phase can start. It is noted that when the spreading carriage 1 returns to its starting position, the spreading arms 16 are spread outwards so that the newly-cut mouth opening of the tube blank is spread out by means of said arms. As the point where the tube blank was cut is arranged to locate substantially in a transverse plane to which the gripping jaws 24 of the pulling carriage 2 return when said pulling carriage is moving to its starting position, the edge of the mouth opening of the next sack will be within reach of said gripping claws in the starting position.

The different parts of the apparatus can simply be made to operate by means of mechanic, electric, hydraulic or pneumatic operating devices, and the functions of the operating devices can be synchronized by means of different limit switches, photo cells and the like.

FIG. 9 schematically shows how an apparatus A of afore-described type is connected to a packing machine. In this figure B represents a machine for stacking the goods to be packed and for filling a sack with said goods and C represents a machine for closing the filled sack. D represents the afore-mentioned moving device in the shape of a rotating wheel, which is provided to move sacks from the sack-pulling machine A close to the filling machine B.

The drawings and the accompanying descriptions are only intended to illustrate the principle of the invention. Regarding details, the apparatus according to the invention may vary considerably within the scope of the claim.

What I claim is:

1. An apparatus for forming a sack from a continuous tube blank (8) of flexible material such as plastics and for stretching out said sack to an opened position upon a filling rack (4) comprising at least two jaws (26), said apparatus comprising two aligned carriages (1,2) sequentially movable along the same path, one carriage (2) being provided with means (24) for gripping the edge (8a) of the mouth of said tube blank and for pulling said tube blank upon the jaws of the filling rack (4), the other carriage (1) being provided with means (16) for spreading out the mouth opening of said tube blank and means (18) for closing the end of the bag by transverse seaming and cutting of said tube blank when the first-mentioned carriage (2) has pulled a desired tube blank length upon said rack (4).

2. An apparatus according to claim 1, characterized in that said pulling carriage (2) and said spreading carriage (1) are provided with means (30,31) for connecting said carriages together to move simultaneously while the first-mentioned carriage (2) is pulling said tube blank (8) upon the jaws (26) of said rack (4).

3. An apparatus according to claim 1, characterized in that said pulling carriage (2) and said spreading carriage (1) are guided by common rods (3).

4. An apparatus according to claim 1, characterized in that said pulling carriage (2) is provided with cam-controlled (25), pivotable gripping claws (24) on opposite sides of said tube blank (8).

5. An apparatus according to claim 1, characterized in that said spreading carriage (1) is provided with spring-loaded spreading arms (16) inside said tube blank (8) to keep the mouth opening of said tube blank outspread when said carriage is in the starting position of its path of movement (X).

6. An apparatus according to claim 1, characterized in that said spreading carriage (1) is provided with seaming- and cutting ribs (18) mounted pivotably on said carriage and supported by cam-controlled (21) supporting arms (17) on opposite sides of said tube blank (8).

* * * * *